United States Patent [19]

Dill et al.

[11] Patent Number: 4,527,628

[45] Date of Patent: Jul. 9, 1985

[54] METHOD OF TEMPORARILY PLUGGING PORTIONS OF A SUBTERRANEAN FORMATION USING A DIVERTING AGENT

[75] Inventors: Walter R. Dill; Ricky D. Gdanski, both of Duncan, Okla.

[73] Assignee: Halliburton Company, Duncan, Okla.

[21] Appl. No.: 523,824

[22] Filed: Aug. 15, 1983

[51] Int. Cl.³ .............................................. E21B 43/12
[52] U.S. Cl. ..................................... 166/295; 166/285
[58] Field of Search ............... 166/280, 282, 285, 294, 166/295

[56] References Cited

U.S. PATENT DOCUMENTS

| | | | |
|---|---|---|---|
| 1,878,557 | 9/1932 | Wahl . | |
| 2,092,971 | 9/1936 | Herstein . | |
| 2,201,459 | 5/1940 | Van Julst . | |
| 2,410,219 | 10/1946 | Langstroth . | |
| 2,687,358 | 8/1954 | Allberry et al. . | |
| 3,112,303 | 11/1963 | Iaman . | |
| 3,274,549 | 4/1973 | Dill et al. . | |
| 3,319,716 | 5/1967 | Dill . | |
| 3,797,575 | 3/1974 | Dill et al. . | |
| 3,998,272 | 12/1976 | Maly | 166/282 |
| 4,005,753 | 2/1977 | Scheffel et al. | 166/282 |
| 4,163,476 | 8/1979 | Tate | 166/271 |
| 4,191,657 | 3/1980 | Swanson | 166/282 |
| 4,199,625 | 4/1980 | Pilny et al. | 166/295 |
| 4,210,205 | 7/1980 | Allen et al. | 166/307 |
| 4,219,429 | 8/1980 | Allen et al. | 166/307 |
| 4,290,485 | 9/1981 | Free et al. | 166/295 |
| 4,291,069 | 9/1981 | Pilny | 166/295 |
| 4,326,970 | 4/1982 | Cottrell et al. | 166/275 |
| 4,330,450 | 5/1982 | Lipowski et al. | 166/295 |
| 4,393,939 | 7/1983 | Smith et.al. | 166/293 |
| 4,409,110 | 10/1983 | Borchardt et al. | 166/294 |

FOREIGN PATENT DOCUMENTS 433957 8/1935 United Kingdom .

*Primary Examiner*—Stephen J. Novosad
*Assistant Examiner*—William P. Neuder
*Attorney, Agent, or Firm*—Thomas R. Weaver; Edward F. Sherer

[57] ABSTRACT

A method of temporarily plugging a subterranean formation using a diverting material comprising an aqueous carrier liquid and a diverting agent comprising a solid azo compound having an azo component and a methylenic component.

28 Claims, No Drawings

METHOD OF TEMPORARILY PLUGGING PORTIONS OF A SUBTERRANEAN FORMATION USING A DIVERTING AGENT

BACKGROUND OF THE INVENTION

1. Field of the Invention

The present invention relates to a diverting agent for blocking portions of a subterranean formation penetrated by the well bore whereby treating fluids are diverted to other portions of the formation.

2. Description of the Prior Art

Throughout the following disclosure, illustrative examples, and appended claims, the phrases "bridging agent" and "diverting agent" are employed many times. These two phrases are used interchangeably and each one defines and otherwise generally refers to an agent which functions to prevent the flow of liquid into a particular location, usually located in a subterranean formation, whereby the agent "bridges" on the particular location to seal the location and thereby cause the liquid to "divert" to a different location.

In the matrix treatment of subterranean oil and gas producing formations, wherein a treating solution is introduced into the formation, it is often advantageous to temporarily, but selectively plug portions of the formation with a solid material so that the treating solution is caused to flow to other portions of the formation. For example, in the matrix-acidizing of permeable formations, one of the most important factors effecting the success or failure of the acidizing treatment is the proper distribution of the treating acid over the entire producing interval. Due to variations in the permeability of a producing formation, the treating acid enters the most permeable portion which has the least resistance to flow thereby increasing the permeability of that portion and causing it to accept ever increasing quantities of acid. In order to prevent this uneven distribution of the acid, the acid must be diverted from the most permeable portions of the formation into the less permeable portions thereof.

In order to divert the treating fluid from the highly permeable portions of the formation into the less permeable portions of the formation, a volume of treating fluid is pumped into the formation followed by a diverting material (bridging agent in a carrier fluid) to seal off a portion of the formation where the first treating fluid penetrated and then following the diverting material with a second stage of treating liquid which is forced into another portion of the formation. The carrier liquid containing the bridging agent flows most readily into the portion of the formation having the largest pores, fissures, and vugs until that portion is bridged and sealed, thus diverting the remaining fluid to the next permeable portion of the formation. These steps may be repeated until the desired number of stages of treating fluid has been pumped.

A great variety of bridging agents have been used to plug formation openings and to divert treating fluids to other zones of the formation. For example, wax beads have been used as diverting agents. However, the wax beads have been found to have melting points, from about 138° F. to about 192° F., making them useless if the formation treating temperature exceeds their melting point. It has also been found that wax beads, upon melting will sometimes solidify the formation oil in which they dissolve unless they are present in the oil in concentration of less than one pound per gallon of oil.

Naphthalene particles have been used as diverting agents. Naphthalene is readily soluble in oil, melts at about 180° F. and is suitable for only applications at lower formation temperatures.

Sodium chloride, which has a melting point of about 1,470° F. has been used as a diverting agent. Sodium chloride, however, requires that the well be cleaned with water or dilute acid after the formation has been treated, if the salt is not dissolved by the produced formation water or water of the treating fluids. In addition, sodium chloride cannot be used with hydrofluoric acid to treat wells because of the insoluble precipitates which are formed.

Oil wells have been treated using grain blends as bridging agents. Typical grains used are corn, milo, millet, and peas. These grains, when used, as diverting agents, are difficult to remove in the formation and often require that the formation to be treated to be charged with nitrogen under great pressure before such diverting agents are used. The nitrogen blows the diverting agents from the formation openings when the well head pressure is released after the treatment.

U.S. Pat. No. 3,797,575, which is assigned to the assignee of the present invention and is hereby incorporated by reference, discloses diverting-forming additives comprised of relatively water insoluble solid material dissolved in a solvent such as methanol or isopropanol. When the additive is combined with an aqueous treating fluid, the solid material, dissolved in the additive, is precipitated in the aqueous treating fluid into a finally divided form. These precipitated particles act as a diverting agent.

U.S. Pat. No. 3,724,549, which is assigned to the assignee of the present invention and is hereby incorporated by reference, discloses a diverting material for diverting aqueous treating fluids into progressively less permeable subterranean formations comprising a carrier liquid and graded particles of cyclic or linear hydrocarbon resins having between about 20 and about 1,400 carbon atoms. The resin has a melting point of at least about 200° F. and is acid and water insoluble but is oil soluble so that the resin can be removed by the produced oil after the treating operation has been completed.

SUMMARY OF THE INVENTION

The present invention provides a method of diverting an aqueous treating fluid to less permeable portions of a subterranean formation. The method is carried out by contacting the formation with a diverting material. The diverting material comprises a carrier liquid and a diverting agent. The diverting agent is a solid azo organic compound having an azo component and a methylenic component and is characterized by having a melting point of at least 332.6° F., a degree of solubility in water at a temperature of from about 200° F. to about 425° F. and a pressure of 600 pounds per square inch (p.s.i.) of less than about 20 pounds of the compound in 1,000 gallons of water, a degree of solubility in kerosene at a temperature of from about 200° F. to about 425° F. and a pressure of 600 p.s.i. of at least 2 pounds of the compound in 1,000 gallons of kerosene, and a sublimation rate at a temperature of from about 250° F. to about 425° F. of from about 1 percent by weight of the compound in 24 hours to about 100 percent by weight of the compound in 12 hours.

The diverting agent is sufficiently oil soluble so that it has a particularly desirable application in oil producing formations having a temperature of at least 200° F.

Examples of suitable solid azo compounds having an azo component and a methylenic component include compounds represented by the following formulae:

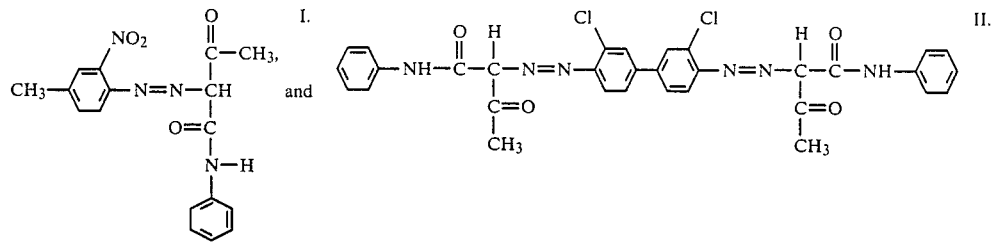

Furthermore, the diverting agent sublimes at a temperature above 250° F. and thus has another desirable application in gas producing formations having a temperature of at least 250° F.

DESCRIPTION OF THE PREFERRED EMBODIMENTS

The carrier liquid used in the method of the present invention must be one in which the bridging agent can be dispersed without solubilizing during the diverting operations. The carrier liquid may be a liquid with which the formation is being treated; for example an aqueous fracturing liquid or an aqueous acid solution. The carrier liquid may not be one in which the bridging agent is too rapidly soluble or with which the bridging agent is reactive.

Therefore the carrier liquid may be an aqueous liquid or an aqueous acid solution, including water or acids gelled with polymers such as gums, celluloses, polysaccharides, polyacrylamides, and alkoxylated fatty amines, or copolymers such as acrylamido propane sulfonic acid and acrylamide copolymers or water or acid solutions that emulsify with low concentrations of hydrocarbon phase. The water may have any pH and may contain other elements in addition to the bridging agent which will not react detrimentally with the bridging agent or the carrier liquid. Surfactants ordinarily used in treating operations will lower surface tensions and interfacial tensions of the carrier fluid to greatly increase the efficiency of mixing operations.

The compound used as the diverting agent in carrying out the method of the present invention is a solid azo organic compound having an azo component and a methylenic component and is characterized by having a melting point of at least 332.6° F., a degree of solubility in water at a temperature of from about 200° F. to about 425° F. and 600 p.s.i. of less than about 20 pounds of the compound in 1,000 gallons of water, a degree of solubility in kerosene at a temperature of from about 200° F. to about 425° F. and 600 p.s.i. of at least 2 pounds of the compound 1,000 gallons of kerosene and a sublimation rate at a temperature of from about 250° F. to about 425° F. of from about 1 percent by weight in 24 hours to about 100 percent by weight in 12 hours.

A methylenic component is a $CH_2$ group so situated in a molecule, that both hydrogens are highly reactive and can be readily replaced, a typical case being one in which the $CH_2$ group is adjacent to a C=O group. The hydrogens of the $CH_2$ group are called tautomeric hydrogens and the methylenic system may exist in either or both of the tautomeric forms, that is the keto form and the enol form either of which may change to the other form.

The preferred azo compound is the compound represented by formula I.

The compound represented by formula I is known as Hansa Yellow G and is available commercially from the Mobay Chemical Corporation and is sold under the trade name Fanchon Yellow YH-5707 pigment.

Hansa Yellow G can be made by coupling orthonitroparatoluidine and acetoacetanilid. Methods of its preparation are well known and are disclosed in U.S. Pat. No. 2,410,219.

The compound represented by formula II is commercially known as Fast Yellow 4RLF dye. This compound is commercially available from Eastman Kodak. Methods for its preparation are well known and are disclosed in U.S. Pat. No. 2,410,219.

The size of the particles of the diverting agent used to carry out the method of the invention will vary over a wide range depending upon the formation to be treated. When it is desired that the diverting agent particles be fine enough to pass through a 20–40 or 40–60 mesh (U.S. Sieve Series) sand pack, it is preferable that the particle size be less than about 10 microns. When the method of the invention is utilized in a subterranean formation containing vugs or fractures, the particle size of the diverting agent is preferably in the range of from about 3 mesh to about 200 mesh. (U.S. Sieve Series) When treating a formation containing natural fractures, the particle size of the diverting agent is preferably about 100 mesh. (U.S. Sieve Series) When the diverting agent is used to seal the permeability of the matrix of a formation, the particle size is preferably from about 1 to about 2 microns. As the preferred particle size of the diverting agent will vary depending upon the formation to be treated, it is recommended that the optimum size be ascertained prior to the treatment.

The bridging agent is preferably present in the carrier fluid in concentrations of from about 0.001 pounds to about 0.3 pounds per gallon of carrier liquid but concentrations outside this range can also be used. The most preferred concentrations of diverting agents are from about 0.01 to about 0.15 pounds per gallon of carrier fluid.

Bridging agent concentrations of less than about 0.001 pound per gallon will not as readily plug formations when used in carrier fluids volumes which are normally available at an oil well site. A progressively large volume of carrier fluid would be required to create adequate formation plugs at concentrations of less than 0.001 pounds per gallon.

Concentrations of bridging agent greater than about 0.30 pounds per gallon would not increase the diverting of the treating fluid to an appreciable extent and therefore are not particularly desirable in carrying out the present invention.

The bridging agent may be added to the carrier fluid continuously as the treating fluid is pumped into the well bore or may be added in intervals in the carrier fluid between stages of the treatment. For instance, in acidizing procedures the bridging agent may be added to the acidizing fluid continuously. Thus, the diverting agent will progressively plug portions of the formation being treated, thereby frustrating the tendency of the acid to flow only into the most permeable portions of the formation and, instead, creating an evenly acidized formation. When the treating fluid is pumped in stages, the first stage is followed by a volume of the diverting material composed of a carrier fluid, usually gelled or emulsified water or acid, containing the bridging agent. The diverting agent seals off the portion of the formation penetrated by the first stage of treating fluid. The second stage of treating fluid is then pumped into another portion of the formation. Alternating volumes of treating fluid and diverting material may be continued to provide a uniformly acidized formation. Although the same technique of continuously introducing the bridging agent in the carrier fluid may be used for fracturing treatments, it is usual for the diverting agent to be added to the carrier fluid in slugs during fracturing operations.

A fracturing liquid is known to preferentially flow into the portion of the subterranean formation which most readily accepts the liquid. After this portion of the formation is fractured, the bridging agent may be added to the fracturing liquid so that it will plug the already fractured portion of the formation. Because the fracturing fluid is preferentially flowing into the fracture zone, it will carry the bridging agent with it. The fractured zone is thereby plugged and the fracturing fluid is diverted to the most permeable portion of the formation that is still accepting fluids.

This method of fracturing and diverting may be repeated to obtain multiple fractures.

The diverting agent is removed from the formation by means of sublimation of the diverting agent or by solubilization of the diverting agent by the liquid hydrocarbons. Increasing formation temperatures result in a greater rate of dissolution or sublimation of the diverting agent. For instance, it has been found that at about 250° F., approximately 0.90 percent by weight of the Hansa Yellow G sublimates in 24 hours, while at 300° F., about 3.0 percent by weight sublimates in 24 hours, and at a temperature of about 400° F., about 22% of Hansa Yellow G sublimates in about 24 hours. Fast Yellow 4RLF sublimates, at 300° F., at a rate of about 13 percent by weight in 24 hours, and at 400° F., sublimates at a rate of about 38 percent by weight in 24 hours. The rate of sublimation of the diverting agent increases with increasing formation temperature.

The following are examples of the bridging agent of the present invention and are intended only to further describe certain aspects of the agent. The examples are given primarily for the purpose of illustration; and the invention in its broader aspects, is not to be construed as limited thereto.

EXAMPLE I

A diverting composition was prepared containing water and 5 gallons of a 45 percent by weight Hansa Yellow G slurry per 1,000 gallons of water. The 5 gallons of Hansa Yellow G slurry contained 22.5 pounds of Hansa Yellow G solids. The composition was flowed through a vessel containing an upper layer of either a one inch layer of 20-40 sand or a one inch layer of 40-60 sand and a lower layer of one inch Oklahoma No. 1 sand. the test was carried out at 74° F. and 80 psi. 100 ml. of the composition containing the water and Hansa Yellow G slurry was used to seal the Oklahoma No. 1 sand.

EXAMPLE II

Tests were carried out to demonstrate the permeability reducing capability of Hansa Yellow G. The tests were carried out in a vessel. Secured to the bottom of the vessel was a brea core of 1¼" diameter and 1" length. A composition comprising 700 ml. of water, 2 percent by weight KCl and Hansa Yellow G slurry was used to carry out the test. The Hansa Yellow G slurry contained 45 percent by weight Hansa Yellow G. The amount of Hansa Yellow G slurry used to carry out the tests varied with each test. Prior to passing the composition containing the Hansa Yellow G slurry through the core, a 2 percent by weight KCl solution was passed through the core. The percent of permeability reduction was calculated by comparing the flow rate of the 2% by weight KCl solution with the flow rate at 25-36 minutes of the composition containing the Hansa Yellow G slurry.

The vessel was pressured during the tests to 500 psi and had a temperature of 74° F. The amount of filtrate collected was measured by the amount of composition bleed-off through the core.

The results of these tests are shown in Table II.

TABLE II

| | FLOW DATA USING BREA CORE AND HANSA YELLOW G | | | | | | | | |
|---|---|---|---|---|---|---|---|---|---|
| 2% KCl | Vol. % | ACCUMULATIVE FILTRATE (MILLILITERS) | | | | | | | |
| Flow Rate (ml/1 min) | Hansa* YELLOW G | 15 Sec | 1 Min | 4 Min | 9 Min | 16 Min | 25 Min | 36 Min | % Permeability Reduction |
| 1603 | 0.025 | 116 | 146 | 224 | 350 | 487 | 640 | — | 99.99 |
| 1603 | 0.050 | 106 | 141 | 208 | 280 | 363 | 457 | 550 | 99.99 |
| 1524 | 0.100 | 83 | 100 | 170 | 264 | 345 | 432 | 522 | 99.99 |
| 942 | 0.250 | 27 | 45 | 84 | 130 | 180 | 232 | 286 | 99.30 |
| 566 | 0.500 | 12 | 27 | 61 | 99 | 150 | 180 | 222 | 99.10 |
| 639 | 1.000 | 8 | 18 | 42 | 70 | 100 | 130 | 160 | 99.50 |
| 1370 | 2.000 | 6 | 15 | 34 | 56 | 78 | 101 | 124 | 99.80 |
| 320 | 0.500 | 29 | 62 | 120 | 173 | 233 | 303 | 385 | 99.10 |

*Vol. % was based on the volume of Hansa Yellow G slurry and volume of 2% KCl carrier fluid.

Although certain preferred embodiments of the invention have been herein described for illustrative purposes, it will be appreciated that various modifications and innovations of the procedures and compositions recited may be effective without departure from the basic principles which underlie the invention. Changes of this type are therefore deemed to lie within the spirit and scope of the invention except as may be necessarily limited by the amended claims or reasonable equivalence thereof.

What is claimed:

1. A method of diverting an aqueous treating fluid to less permeable portions of a subterranean formation comprising:
   contacting said formation with a diverting material consisting essentially of
   (A) an aqueous carrier liquid; and,
   (B) a diverting agent comprising a solid azo organic compound having an azo component and a methylenic component and being characterized by
   I. having a melting point of at least 332.6° F.;
   II. having a degree of solubility in water at a temperature of from about 200° F. to about 425° F. and 600 p.s.i. of less than 20 pounds of the compound in 1,000 gallons of water;
   III. having a degree of solubility in kerosene at a temperature of from about 200° F. to about 425° F. and 600 p.s.i. of at least 2 pounds of the compound in 1,000 gallons of kerosene; and,
   IV. having a sublimation rate at a temperature of from about 250° F. to about 425° F. of from about 1 percent by weight in 24 hours to about 100 percent by weight in 12 hours.

2. The method recited in claim 1 wherein the diverting agent is selected from the group consisting of:

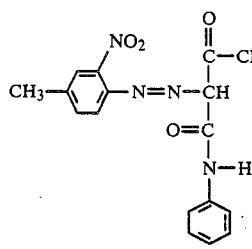 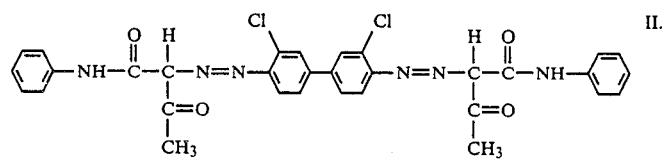

and mixtures of I and II.

3. The method recited in claim 2 wherein the diverting agent is present in the aqueous carrier liquid in an amount of from about 0.001 pounds to about 0.3 pounds per gallon of the carrier liquid.

4. The method recited in claim 3 wherein the aqueous carrier liquid is an aqueous acid solution.

5. The method recited in claim 4 wherein the aqueous acid solution is gelled.

6. The method recited in claim 2 wherein the formation is selected from the group consisting of an oil producing formation having a temperature of at least 200° F. and a gas producing formation having a temperature of at least 250° F.

7. The method recited in claim 5 wherein the aqueous acid solution is gelled with a polymer selected from the group consisting of gums, celluloses, polysaccharides, polyacrylamides, alkoxylated fatty amines, and mixtures thereof.

8. The method recited in claim 3 wherein the diverting agent has a particle size of from about 3 mesh to about 200 mesh.

9. The method recited in claim 2 wherein the diverting material is pumped intermittently into the formation.

10. The method recited in claim 2 wherein the diverting material is pumped continuously into the formation.

11. A method of temporarily plugging a portion of a subterranean formation comprising introducing into the subterranean formation a diverting material consisting essentially of
   (A) an aqueous carrier liquid; and,
   (B) a diverting agent comprising a solid azo organic compound having an azo component and a methylenic component and being characterized by
   I. having a melting point of at least 332.6° F.;
   II. having a degree of solubility in water at a temperature of from about 200° F. to about 425° F. and 600 p.s.i. of less than 20 pounds of the compound in 1,000 gallons of water;
   III. having a degree of solubility in kerosene at a temperature of from about 200° F. to about 425° F. and 600 p.s.i. of at least 2 pounds of the compound in 1,000 gallons of kerosene; and,
   IV. having a sublimation rate at a temperature of from about 250° F. to about 425° F. of from about 1 percent by weight in 24 hours to about 100 percent by weight in 12 hours.

12. The method recited in claim 11 wherein the diverting agent is selected from the group consisting of:

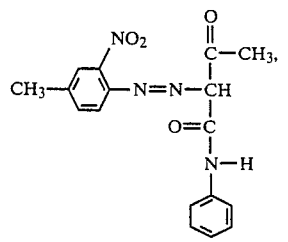 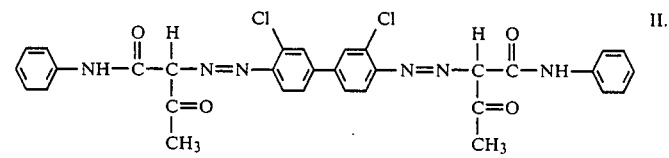

and mixtures of I and II.

13. The method recited in claim 12 wherein the diverting agent is present in the aqueous carrier liquid in an amount of from about 0.001 pounds to about 0.3 pounds per gallon of the carrier liquid.

14. The method recited in claim 13 wherein the aqueous carrier liquid is an aqueous acid solution.

15. The method recited in claim 14 wherein the aqueous acid solution is gelled.

16. The method recited in claim 12 wherein the formation is selected from the group consisting of an oil producing formation having a temperature of at least 200° F. and a gas producing formation having a temperature of at least 250° F.

17. The method recited in claim 15 wherein the aqueous acid solution is gelled with a polymer selected from the group consisting of gums, celluloses, polysaccharides, polyacrylamides, alkoxylated fatty amines, and mixtures thereof.

18. The method recited in claim 16 wherein the diverting agent has a particle size of from about 3 mesh to about 200 mesh.

19. The method recited in claim 18 wherein the diverting material is pumped intermittently into the formation.

20. The method recited in claim 18 wherein the diverting material is pumped continuously into the formation.

21. A method of diverting an aqueous treating fluid to less permeable portions of a subterranean formation comprising:

contacting said formation with a diverting material comprising (A) an aqueous carrier liquid; and, (B) a diverting agent selected from the group consisting of:

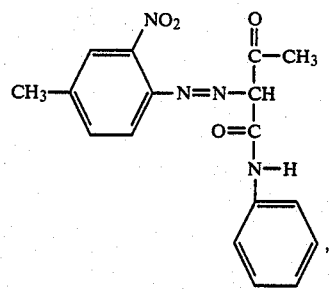

I.

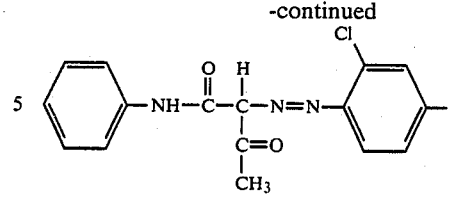

II.

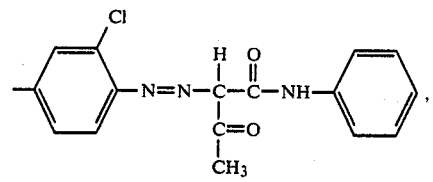

and mixtures of I and II.

22. The method recited in claim 21 wherein the diverting agent is

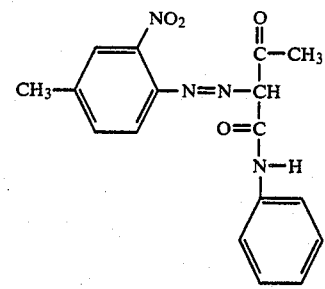

I.

23. The method recited in claim 21 wherein the diverting agent is present in the aqueous carrier liquid in an amount of from about 0.001 pounds to about 0.3 pounds per gallon of the carrier liquid.

24. The method recited in claim 23 wherein the aqueous carrier liquid is an aqueous acid solution.

25. The method recited in claim 24 wherein the aqueous acid solution is gelled.

26. The method recited in claim 25 wherein the formation is selected from the group consisting of an oil producing formation having a temperature of at least 200° F. and a gas producing formation having a temperature of at least 250° F.

27. The method recited in claim 25 wherein the aqueous acid solution is gelled with a polymer selected from the group consisting of gums, celluloses, polysaccharides, polyacrylamides, alkoxylated fatty amines, and mixtures thereof.

28. The method recited in claim 21 wherein the diverting agent has a particle size of from about 3 mesh to about 200 mesh.

* * * * *